(12) United States Patent
Jones et al.

(10) Patent No.: US 7,399,731 B2
(45) Date of Patent: Jul. 15, 2008

(54) ELECTRICALLY CONDUCTIVE NON-AQUEOUS WELLBORE FLUID

(75) Inventors: Timothy Gareth John Jones, Cambridgeshire (GB); Gary John Tustin, Cambridgeshire (GB)

(73) Assignee: M-I L.L.C., Houston, TX (US)

( * ) Notice: Subject to any disclaimer, the term of this patent is extended or adjusted under 35 U.S.C. 154(b) by 98 days.

(21) Appl. No.: 10/314,876

(22) Filed: Dec. 9, 2002

(65) Prior Publication Data

US 2003/0132033 A1  Jul. 17, 2003

(30) Foreign Application Priority Data

Dec. 7, 2001  (GB)  ................... 0129382.8

(51) Int. Cl.
  *C09K 8/34*  (2006.01)
(52) U.S. Cl. .................. 507/138; 507/136; 507/139
(58) Field of Classification Search .................. 507/140, 507/267
See application file for complete search history.

(56) References Cited

U.S. PATENT DOCUMENTS

| | | | |
|---|---|---|---|
| 2,721,841 A | | 10/1955 | Fischer |
| 2,764,546 A | * | 9/1956 | Engle .................. 507/138 |
| 4,012,329 A | | 3/1977 | Hayes et al. |
| 4,647,859 A | | 3/1987 | Son et al. |
| 5,322,872 A | * | 6/1994 | Quinn .................. 524/186 |
| 5,711,900 A | | 1/1998 | Jones |
| 6,006,831 A | | 12/1999 | Schlemmer et al. |
| 6,029,755 A | | 2/2000 | Patel |
| 6,248,699 B1 | * | 6/2001 | Subramanian et al. ...... 507/265 |
| 6,308,788 B1 | | 10/2001 | Patel et al. |
| 6,405,809 B2 | | 6/2002 | Patel et al. |
| 6,719,053 B2 | * | 4/2004 | Thompson ............... 166/305.1 |
| 6,770,603 B1 | | 8/2004 | Sawdon et al. |
| 6,849,581 B1 | * | 2/2005 | Thompson et al. .......... 507/118 |
| 2003/0045605 A1 | * | 3/2003 | Thompson .................. 523/130 |

FOREIGN PATENT DOCUMENTS

EP  0902302  3/1999

JP  47-35268 B  *  5/1972

OTHER PUBLICATIONS

S.S. Bhatnagar et al., "Studies in the Properties of Bivalent Metal Oleates—Part I", Proc. Ind. Acad. Sci., 9A, 1939, pp. 143-158.
W.F. Whitmore et al., "Metallic Soaps—Their Use, Preparation, and Properties", Industrial and Engineering Chemistry, vol. 22, No. 6, 1930, pp. 646-649.
H. Silman, "Metallic Soaps", Soap, 12, 1936, pp. 31-33, 39.
S. Nakabayashi et al., "A Newly Designed Electrochemical Medium Using Crown Ether and Its Application to Electrochemical and Photoelectrochemical Reactions", J. Electroanalytical Chem., 149, 1983, pp. 41-47.
Y. Zhu et al., "The Study of Lubricant Additive Reactions Using Non-Aqueous Electrochemistry", Tribology Transactions, vol. 43, No. 2, 2000, pp. 175-186.
M. Salomon, "Conductometric Study of Cationic and Anionic Complexes in Propylene Carbonate", Journal of Solution Chemistry, vol. 19, No. 12, 1990, pp. 1225-1236.
K.N. Mehrotra et al., "Thermodynamics of Micellization and Conductance Behaviour of Lanthanide Palmitates in Mixed Organic Solvents", Tenside Surf. Det., 31, 1994, pp. 269-272.

* cited by examiner

*Primary Examiner*—Marc S Zimmer
(74) *Attorney, Agent, or Firm*—Dann, Dorfman, Herrell and Skillman, P.C.

(57) ABSTRACT

A non-aqueous wellbore fluid comprises a non-aqueous continuous phase with one or more organic salts having the formula $((R_1-Q)_pX)_mZ_n$, one or more oligomeric organic salts based on linked $((R_1-Q)_pX)_mZ_n$ subunits, or a combination thereof dissolved therein. X is a negatively charged functional group. $R_1$ is an organic group comprising a principal straight chain and one or more side chains which branch from and are shorter than said principal straight chain. Q is a covalent bond or a polar linkage group which connects a terminal atom of the principal straight chain of the organic group $R_1$ to the functional group X. p is a positive integer which is the number of organic groups $R_1$ which are connected to the functional group X. Z is a cation. m and n are positive integers which ensure that the organic salts are charge neutral. The one or more organic salts increase the electrical conductivity of the wellbore fluid.

23 Claims, 6 Drawing Sheets

2-Ethyl,2-methyl hepatanoic acid
(aka Neodecanoic acid or versatic acid)

2-Ethyl hexanoic acid

Potassium 2-Ethyl hexanoate

Neopentyl glycol     Brij 30

ELECTRICALLY CONDUCTIVE NON-AQUEOUS WELLBORE FLUID

FIELD OF THE INVENTION

The present invention relates to an electrically conductive non-aqueous wellbore fluid, uses of such a fluid, and an additive and method for increasing the electrical conductivity of a non-aqueous wellbore fluid.

BACKGROUND OF THE INVENTION

In the process of rotary drilling a well, a drilling fluid or mud is circulated down the rotating drill pipe, through the bit, and up the annular space between the pipe and the formation or steel casing, to the surface. The drilling fluid performs different functions such as removal of cuttings from the bottom of the hole to the surface, to suspend cuttings and weighting material when the circulation is interrupted, control subsurface pressure, isolate the fluids from the formation by providing sufficient hydrostatic pressure to prevent the ingress of formation fluids into the wellbore, cool and lubricate the drill string and bit, maximise penetration rate etc. An important objective in drilling a well is also to secure the maximum amount of information about the type of formations being penetrated and the type of fluids or gases in the formation. This information is obtained by analysing the cuttings, by electrical logging technology and by the use of various downhole logging techniques, including electrical measurements.

The required functions can be achieved by a wide range of fluids composed of various combinations of solids, liquids and gases and classified according to the constitution of the continuous phase mainly in two groupings: aqueous drilling fluids, and non-aqueous drilling fluids.

Aqueous fluids are the most commonly used drilling fluid type. The aqueous phase is made up of fresh water or, more often, of a brine. As discontinuous phase, they may contain gases, water-immiscible fluids such as diesel oil which form an oil-in-water emulsion, and solids including clays and weighting material such as barite. The properties are typically controlled by the addition of clay minerals, polymers and surfactants.

In drilling water-sensitive zones such as reactive shales, production formations, or where bottom hole temperature conditions are severe or where corrosion is a major problem, non-aqueous drilling fluids are preferred. The continuous phase is typically a mineral or synthetic oil and commonly contains water or brine as discontinuous phase to form a water-in-oil or invert emulsion. Non-aqueous fluids also typically contain a solid phase, which is essentially similar to that of aqueous fluids, and additives for the control of density, rheology and fluid loss. The invert emulsion is formed and stabilised with the aid of one or more specially selected emulsifiers.

Although non-aqueous drilling fluids are more expensive than water-based muds, it is because of their superior technical performance that they are often used for drilling operations.

However, because of their very low electrical conductivity oil-based muds have been at a technical disadvantage in the area of electrical well-logging. Various logging operations are performed during the drilling operation, for example while drilling in the reservoir region of an oil/gas well, in order to image or otherwise analyse the type of formation and the material therein. In this way it is possible to locate the pay zone, i.e. where the reservoir is perforated in order to allow the inflow of hydrocarbons to the wellbore.

Some logging tools work on the basis of resistivity contrast at different parts of the formation. These are known as resistivity logging tools. Briefly alternating current flows through the formation between electrodes of the logging tool. The fluid in the formation comprises intrinsic formation fluid and filtrate which has penetrated the formation from the wellbore. Thus the resistivity of the formation will vary depending on e.g. the permeability of the formation and the ratio of formation fluid to filtrate in the formation.

At present the use of resistivity logging tools is limited mainly to cases where an aqueous drilling fluid is used for the drilling operation, as the very low conductivity of the non-aqueous continuous phase in e.g. oil-based muds precludes the use of resistivity tools in such fluids. Although brine dispersed in the non-aqueous continuous phase is electrically conductive, the discontinuous nature of the droplets prevents the flow of electricity. Indeed, the inability of such emulsions to conduct electricity (until a very high potential difference is applied) is used as a standard test of emulsion stability. The electrical conductivity of the oil-base of a typical non-aqueous wellbore fluid is commonly in the range $10^{-8}$ to $5\times10^{-4}$ $iS \cdot cm^{-1}$ at 20° C. while an electrical conductivity of not less than 0.1 $iS \cdot cm^{-1}$ and preferably of not less than 10 $iS \cdot cm^{-1}$ is desirable for electrical logging operations.

Another example where fluid conductivity plays an important part in the drilling operation is in directional drilling where signals produced at the drill assembly are transmitted through an electrically conductive medium to the control unit and/or mud telemetry unit further back on the drill string.

In our previous application WO 99/14285 we described wellbore fluids with a non-aqueous continuous phase comprising a polar organic liquid and a dissolved quaternary ammonium salt (e.g. tetrabutyl ammonium halide) which forms an organic cation in solution. While it is possible in this way to increase significantly the conductivity of the wellbore fluid, a problem remains that such salts can be toxic e.g. to marine animal life. Therefore, such fluids may not be suitable for use in off-shore hydrocarbon recovery operations.

Salts which produce organic anions have also been investigated with the aim of imparting conductivity to non-aqueous solubilising agents. Thus, for example, magnesium oleate as been used as an anti-static additive in dry-cleaning fluids (see e.g. W. F. Whitmore and M. Lauro, *Ind. Eng. Chem.*, 22, 646-649, (1930) and H. Silman, *Soaps*, 12, 31-33, (1936))). However, such investigations have not generally been pursued in the area of hydrocarbon recovery because commonly-available, organic anion-producing salts, such as metal oleates, have low solubilities in the continuous phase of typical non-aqueous wellbore fluids.

An object of the present invention is to provide an electrically conductive non-aqueous wellbore fluid with a low toxicity.

Definitions

The term "organic", when used herein, pertains to compounds and/or groups which comprise, at least, carbon atoms.

The terms "carbo", "carbyl", "hydrocarbo" and "hydrocarbyl", when used herein, pertain to compounds and/or groups which have only carbon and hydrogen atoms.

The term "ring", when used herein, pertains to a closed ring of from 3 to 10 covalently linked atoms, more preferably 3 to 8 covalently linked atoms.

The term "cyclic", when used herein, pertains to compounds and/or groups which have one ring, or two or more rings (e.g. spiro, fused, bridged). Compounds with one ring may be referred to as "monocyclic" or "mononuclear" whereas compounds with two or more rings may be referred to as "polycyclic" or "polynuclear".

The term "aliphatic", when used herein, pertains to compounds and/or groups which are linear or branched, but not cyclic (also known as "acyclic" or "open-chain" groups).

The term "aromatic ring", when used herein, pertains to a closed ring of from 3 to 10 covalently linked atoms, more preferably 5 to 8 covalently linked atoms, which ring is aromatic.

The term "heterocyclic ring", when used herein, pertains to a closed ring of from 3 to 10 covalently linked atoms, more preferably 3 to 8 covalently linked atoms, wherein at least one of the ring atoms is a multivalent ring heteroatom, for example, nitrogen, phosphorus, silicon, oxygen, and sulphur, though more commonly nitrogen, oxygen, and sulphur.

The term "aromatic", when used herein, pertains to compounds and/or groups which have one ring, or two or more rings (e.g., fused), wherein said ring(s) are aromatic.

The term "alicyclic", when used herein, pertains to compounds and/or groups which have one ring, or two or more rings (e.g., spiro, fused, bridged), wherein said ring(s) are not aromatic.

The term "straight chain", when used herein, pertains to a chain of consecutively linked atoms, all of which or the majority of which are carbon atoms. Side chains may branch from the straight chain, but the number of atoms in the straight chain does not include the number of atoms in any such side chains.

By "non-aqueous wellbore fluid" we mean a fluid (such as a drilling fluid, fracturing fluid etc.) which has a non-aqueous continuous phase formed from oil, synthetic base, natural base, or a mixture thereof. Examples of typical oils are crude oil, and hydrocarbon refined fractions from crude oil such as diesel fuel or mineral oil. Examples of typical synthetic bases are synthetic hydrocarbons such as n-paraffins, alpha-olefins, internal olefins and poly-alphaolefins; and synthetic liquids such as dialkyl ethers, alkyl alkanoate esters and acetals. Examples of natural bases are triglycerides such as rape-seed oil and sunflower oil. Discontinuous phases, such as aqueous emulsions (e.g. formed from brine) and solids (e.g. clays and barite or hematite weighting agents), may be present in the fluid. Furthermore, the fluid may contain additives such as polymers and surfactants e.g. to stabilise emulsions or to act as fluid loss control agents.

By an "oligomeric" or "oligomer" organic salt we mean that the structure of the salt is based on from two to eight (preferably two to five, and more preferably two or three) linked organic salt subunits, each subunit having a negatively charged head group and an organic tail group which is bonded at a terminal atom thereof to the head group. The subunits are linked head group-to-head group in the oligomer, by (e.g. $C_1$, $C_2$, $C_3$, $C_4$, $C_5$, or $C_6$) organic (preferably aliphatic and/or hydocarbyl) linkage groups or covalent bonds. The oligomer, therefore, has distinct tail groups corresponding to the tail groups of the subunits and a super-head group formed from the plural head groups of the subunits. Although the oligomer is defined in relation to a chemically-corresponding subunit, in practice the oligomer surfactant may be synthesised using a different subunit. For example, a synthesis route may be adopted in which subunits are first oligomerised and the head groups are then changed to those of the desired negatively charged head group. That is, the head groups of the subunits used for the oligomerisation may be different from the head groups of the subunits to which the final oligomer chemically corresponds.

SUMMARY OF THE INVENTION

The present invention is at least partly based on the discovery that the solubility in hydrocarbon solubilising agents of organic salts having an organic group attached to a negatively charged functional group can be significantly enhanced when the organic group has a branched structure, and particularly when the branched structure is in the region of the negatively charged functional group.

In a first aspect, the present invention provides a non-aqueous wellbore fluid comprising a non-aqueous continuous phase with one or more organic salts having the formula $((R_1\text{-}Q)_pX)_mZ_n$, one or more oligomeric organic salts based on linked $((R_1\text{-}Q)_pX)_mZ_n$ subunits, or a combination thereof dissolved therein;

wherein: X is a negatively charged functional group, $R_1$ is an organic (preferably aliphatic) group comprising a principal straight chain and one or more side chains which branch from and are shorter than said principal straight chain, Q is a covalent bond or a polar linkage group which connects a terminal atom of the principal straight chain of the organic group $R_1$ to the functional group X, p is a positive integer (e.g. 1, 2, 3 etc.) which is the number of organic groups $R_1$ which are connected to the functional group X, Z is a cation (which may be inorganic or organic), and m and n are positive integers (e.g. 1, 2, 3 etc.) which ensure that the organic salts are charge neutral;

whereby the one or more organic salts increase the electrical conductivity of the wellbore fluid.

Preferably none of the one or more organic salts are sodium citrate.

We have observed a surprising increase in salt solubility in the continuous phase of non-aqueous wellbore fluids, compared to equivalent unbranched salts, when the organic group $R_1$ of the salt has such a branched structure. This enhanced solubility leads in turn to an increased electrical conductivity, and we have been able to obtain conductivities of $0.1$ $iS \cdot cm^{-1}$ and higher at 20° C.

The organic anions effectively act as surfactants, with the organic groups $R_1$ forming (surfactant) tail groups, and the X functional groups (and optionally the Q groups, when Q is a polar linkage group) forming (surfactant) head groups. Thus in embodiments having oligomeric organic salts, the subunits are typically linked via the Q and/or X groups.

In contrast to e.g. quaternary ammonium salts, we believe that the organic anions of the dissolved salts have a micellar structure in the continuous phase. The electrical conductivity is then apparently caused by opposite migration of the micelles and the cations in the solution, cation migration along an essentially stationary micellar structure, or a mixture of both mechanisms.

Advantageously, and particularly when Z is a metal cation, the toxicity profiles of salts according to this aspect of the invention are generally substantially lower than e.g. quaternary ammonium salts, thus extending the range of circumstances in which such wellbore fluids may be used.

Preferably, p takes the value 1 or 2.

When p equals 1, the functional group X may be an anion-forming functional group such as a:

carboxylate group, —COO$^-$,
sulphate group, —OSO$_3^-$,
sulphonate group, —SO$_3^-$,
mono phosphate group, —OPO$_3^{2-}$,
bis phosphate group,

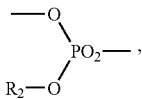

mono phosphonate group, —PO$_3^{2-}$,
bis phosphonate group,

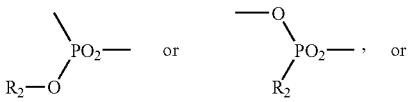

xanthate group, —OCSS$^-$, where $R_2$ is a relatively small organic (preferably hydrocarbyl) group containing e.g. 1, 2 or 3 carbon atoms, or is an (e.g. $C_1$, $C_2$, $C_3$, $C_4$, $C_5$, or $C_6$) organic (preferably aliphatic and/or hydrocarbyl) linkage group or covalent bond connecting the functional group X to the adjacent functional group X or polar linkage group Q in an oligomeric organic salt.

For the avoidance of doubt, when X is a carboxylate group, the carbon atom of the carboxylate group is not included in the organic group, $R_1$.

Although, some of these functional groups (e.g. xanthate) have higher toxicity profiles than others, they may still be used e.g. in closed drilling operations.

When p equals 2, the functional group X may be an anion-forming functional group such as a:

bis phosphate group,

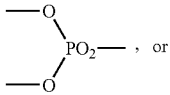

bis phosphonate group,

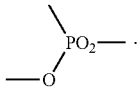

Compared to salts in which p equals 1, salts with p equal to 2 or more tend to generate higher viscosities in the wellbore fluid. However, an advantage of the higher p salts is that the additional organic groups $R_1$ appear to reduce the solubility of the salts in water thereby discouraging partitioning into the aqueous phase (if present).

We have found that the solubility of the organic salt is strongly influenced by the position of the side chain or chains of the or each organic group $R_1$. In particular, it is desirable for the side chain or chains to be close to the functional group X. Thus if the carbon atoms of the principal straight chain are numbered sequentially, with the carbon atom closest to the functional group being $C_1$, it is preferred that the side chains branch from the $C_1$, $C_2$ or $C_3$ atom. Most preferably the or each side chain branches from the $C_1$ atom. This seems to result in the highest solubilities and conductivities, possibly because branching close to the functional group promotes solubility in hydrocarbons while not significantly interfering with the ability of the anions to adopt a micellar structure.

Preferably the or each organic group $R_1$ has one or two side chains.

The concentration (i.e. total concentration) of the organic salts in the non-aqueous continuous phase may be in the range 0.001 to 3 M at 20° C., preferably 0.01 to 2 M, and more preferably 0.1 to 1 M.

The or each principal straight chain may contain from 3 to 25 carbon atoms, and preferably contains 5, 6, 7, 8, 9 or 10 carbon atoms. If the number of atoms is too high, the salt may have a (generally undesirable) viscosifying effect on the wellbore fluid.

The or each side chain may contain from 1 to 6 carbon atoms, and preferably contains 1, 2 or 3 carbon atoms.

The or each principal straight chain and/or the or each side chain may be a hydrocarbyl group.

The or each organic group $R_1$ may comprise only the principal straight chain and side chain(s).

In embodiments in which Q is a polar linkage group, Q may be e.g.:
an ester group, —C(=O)O— or —OC(=O)—,
an oxycarbonyloxy group, —OC(=O)O—,
an ether group, —O—,
a keto group, —C(=O)—,
a thione group, —C(=S)—,
a sulphide group, —S—,
a disulphide group, —S—S—,
an imino group, —C(=NR$_3$)—,
an amino group, —N(R$_3$)—,
an amido group, —N(R$_3$)C(=O)— or —C(=O)N(R$_3$)—,
an amide group, —ON(R$_3$)— or —N(R$_3$)O—,
an amidine group, —C(=NR$_3$)N(R$_3$)— or —N(R$_3$)C(=NR$_3$)—,
a ureido group, —N(R$_3$)C(=O)N(R$_3$)—, or
a thioamido group, —N(R$_3$)C(=S)— or —C(=S)N(R$_3$)—, $R_3$ being a hydrogen atom or a relatively small organic (preferably hydrocarbyl) group containing e.g. 1, 2 or 3 carbon atoms, or $R_3$ being an (e.g. $C_1$, $C_2$, $C_3$, $C_4$, $C_5$, or $C_6$) organic (preferably aliphatic and/or hydrocarbyl) linkage group or covalent bond connecting the polar linkage group Q to the adjacent functional group X or polar linkage group Q in an oligomeric organic salt.

In preferred embodiments, Q is:
an ester group, —C(=O)O— or —OC(=O)—, or
an ether group, —O—.

In such embodiments, the functional group preferably consists of an anion-forming functional group and one or more $C_1$ to $C_{10}$ (preferably $C_2$, $C_3$, $C_4$, $C_5$ or $C_6$) aliphatic or cyclic (preferably hydrocarbyl) groups $R_4$ which connect the functional group to the one or more polar linkage groups. A cyclic $R_4$ group may comprise an aromatic ring. The $R_4$ group can conveniently provide a position at which an (e.g. $C_1$, $C_2$, $C_3$, $C_4$, $C_5$, or $C_6$) organic (preferably aliphatic and/or hydocarbyl) linkage group or covalent bond connects the functional group X to an adjacent functional group X or polar linkage group Q, thereby forming an oligomeric organic salt.

For example, when p equals 1 the functional group may be e.g.:
—R$_4$COO$^-$,
—R$_4$OSO$_3^-$,
—R$_4$SO$_3^-$,
—R$_4$OPO$_3^{2-}$,

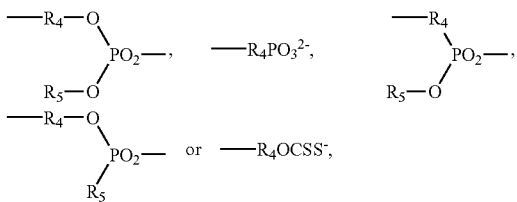

and when p equals 2 the functional group may be e.g.:

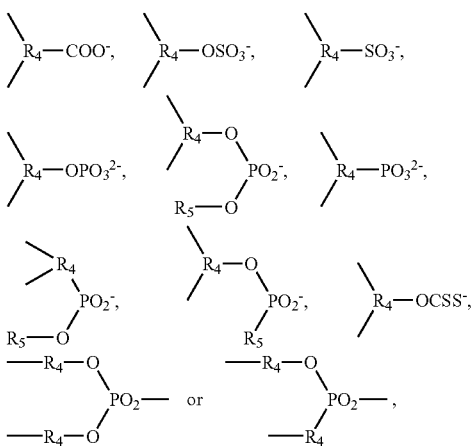

where (like $R_2$) $R_5$ is a relatively small organic (preferably hydrocarbyl) group containing e.g. 1, 2 or 3 carbon atoms, or is an (e.g. $C_1$, $C_2$, $C_3$, $C_4$, $C_5$, or $C_6$) organic (preferably aliphatic and/or hydocarbyl) linkage group or covalent bond connecting the functional group X to the adjacent functional group X or polar linkage group Q in an oligomeric organic salt.

When Q is a polar linkage group it is still preferable for the side chain(s) of the organic group(s) $R_1$ to be close to the functional group X. In this case, however, each group Q intervenes between the side chain(s) and the functional group. Nonetheless, the side chains still appear to enhance the solubility of the salt.

The combination of a polar group(s) Q and the organic group(s) $R_4$ appears to provide a "shield" against the non-aqueous phase for the anion-forming functional group. The organic salts are then apparently able to form more stable micelles in the non-aqueous phase without there being a deleterious effect on the $pK_{sp}$ of the salts.

Desirably Z is a metal cation. For example, Z may be an alkali (e.g. $Li^+$, $K^+$ or $Na^+$) or alkaline earth (e.g. $Mg^{2+}$, $Ca^{2+}$, $Sr^{2+}$ or $Ba^{2+}$) metal counterion, and preferably is $Mg^{2+}$ or $Ca^{2+}$. We have found, for example, that calcium versatate (2-ethyl, 2-methyl heptanoate or neodecanoate) is particularly soluble in oil. Z may also be e.g. $Gd^{3+}$ or $Al^{3+}$, but in general we have found that the conductivity does not increase in proportion to the charge on the cation. Also mono- or divalent salts tend to be less viscosifying than trivalent salts. We expect divalent salts to have less of a tendency to leach into formation water compared to monovalent salts.

Less desirably, Z may be an organic cation, e.g. a quaternary ammonium cation such as tetramethylammonium or tetraethylammonium. However, this will tend to raise the toxicity profile of the wellbore fluid.

The organic salts may be formed in situ in the wellbore. For example, if sodium versatate is added to the wellbore fluid, ion exchange with naturally occurring $Ca^{2+}$ ions in formation water may form calcium versatate in the non-aqueous continuous phase of the wellbore fluid. Alternatively versatic acid may be added to the wellbore fluid and the acid then neutralised to form calcium versatate in the continuous phase e.g. by a further addition of $Ca(OH)_2$ to the wellbore fluid.

The non-aqueous continuous phase may further comprise a solubility-enhancing amount of one or more of the organic acids corresponding to the organic salts (e.g. to form 1 to 20 percent by weight of the total of the organic acids and the organic salts). We have found that such acids can improve the solubility of the salts and reduce the viscosity of the continuous phase. By "an organic acid corresponding to an organic salt" we mean an acid that has the organic group(s) $R_1$, optional polar linkage group(s), and functional group(s) X corresponding to the anion of the organic salt. For example, the acids corresponding to $(R_1-COO^-)_m Z_n$, $(R_1-OSO_3^-)_m Z_n$, $(R_1-SO_3^-)_m Z_n$, $(R_1-OPO_3^{2-})_m Z_n$, $(R_1-PO_3^{2-})_m Z_n$, and $(R_1-OCSS^-)_m Z_n$ are respectively $R_1-COOH$, $R_1-OSO_3H$, $R_1-SO_3H$, $R_1-OPO_3H_2$, $R_1-PO_3H_2$ and $R_1-OCSSH$.

The wellbore fluid may have an electrical conductivity of at least 0.1 $iS \cdot cm^{-1}$ at 20° C. and at a frequency of 1 kHz (although we have found that the frequency at which conductivity measurements are made does not appear to be overly significant, at least in the frequency range 0 to 10 kHz), and preferably of at least 1, 2, 5, 10 or 20 $iS \cdot cm^{-1}$.

In a preferred embodiment, the wellbore fluid further comprises an electrical conductivity-enhancing amount of an organic solubilising agent. Preferably the solubilising agent has a dielectric constant of at least 5, and more preferably of at least 10 or 20.

The dielectric constant is essentially a measure of the polarity of the solubilising agent. We have found that polar solubilising agents have a positive effect on the conductivity, which we believe is due to the solubilising agent encouraging separation of the or each cation of the organic salt from its respective anion(s) and thus improving the mobility of the current carrying species.

The organic solubilising agent may be e.g. an alcohol or diol such as neopentyl glycol, an ether such as polyoxyethylene(4) lauryl ether (Brij™ 30), or a mixture thereof. These solubilising agents have the advantage of being relatively rapidly environmentally degradable.

However, other solubilising agents or mixtures of solubilising agents also enhance the electrical conductivity and may be used, although some, such as crown ethers, are relatively expensive and persist for longer in the environment.

The solubilising agent may be a nonionic surfactant compound including in particular the reaction product of compounds having a hydrophobic group and a reactive hydrogen atom, for example aliphatic alcohols, acids, amides or alkyl phenols with alkylene oxides, especially ethylene oxide.

Preferably the solubilising agent has from 3 to 18 carbon atoms and more preferably 8 to 16 carbon atoms. The solubilising agent may be a solid or a liquid.

An alcohol solubilising agent may be methanol, ethanol, propan-1-ol, isopropanol (propan-2-ol), butan-1-ol, sec-butanol, t-butanol, pentan-1-ol, hexan-1-ol, hexan-2-ol, octan-1-ol, lauryl alcohol, oleyl alcohol, or 2-ethylhexanol.

A diol solubilising agent may be ethylene glycol, propylene-1,2-diol, propylene-1,3-diol, butan-1,4-diol, pentan-1,5-diol, pentan-1,2-diol, octan-1,8-diol, octan-1,2-diol, octadecan-1,2-diol, cyclohexan-1,2-diol, neopentyl glycol (2,2-dimethyl-1,3-propanediol), 2-ethyl-2-methyl-1,3- propanediol, 2,2-diethyl-1,3-propanediol, 2-methyl-2-propyl-1,3-propanediol, or 2-butyl-2-ethyl-1,3-propanediol.

An ether solubilising agent may be any Brij™ (polyoxyethylene alkyl ether) compound (such as polyoxyethylene(4) lauryl ether, polyoxyethylene(2) cetyl ether, polyoxyethylene(2) stearyl ether, or polyoxyethylene(2) oleyl ether), any Igepal™ (polyoxyethylene octylphenyl or nonylphenyl ether) compound (such as polyoxyethylene(2) isooctylphenyl ether, polyoxyethylene(5) isooctylphenyl ether, polyoxyethylene(2) nonylphenyl ether, or polyoxyethylene(5) nonylphenyl ether), 12-crown-4 ether, 15-crown-5 ether, 18-crown-6 ether, dicyclohexano-24-crown-8 ether, dicyclohexano-18-crown-6 ether, dibutyl ether, dioctyl ether, 1,3,5-trioxane, 1,4-dioxane, 1,4-dioxan-2,3-diol, or any Cellosolve™ (ethanediol ether or ester of an ethanediol ether) compound (such as 2-ethoxyethanol, or 2-ethoxyethyl acetate).

An ester solubilising agent may be ethyl acetate, butyl acetate, amyl acetate, methyl 2-ethylhexanoate, octyl acetate, hexyl butyrate, tributyl citrate, triethyl citrate, methyl oleate, bis(2-ethylhexyl) succinate, any Tween™ (polyoxyethylene sorbitan long-chain fatty acid ester) compound (such as polyoxyethylene(20) sorbitan monolaurate, polyoxyethylene(20) sorbitan monopalmitate, polyoxyethylene(20) sorbitan monostearate, polyoxyethylene(20) sorbitan monooleate, polyoxyethylene(20) sorbitan trioleate), or any Span™ (sorbitan long chain fatty acid ester) compound (such as sorbitan monolaurate, sorbitan monooleate, sorbitan monopalmitate, sorbitan monostearate, sorbitan sesquioleate, or sorbitan trioleate).

An orthoester or acetal solubilising agent may be tripropyl orthoformate, triethyl orthoformate, trimethyl orthobutyrate, malonaldehyde bis(diethyl acetal), 1,2,6,6-tetramethoxyhexane, trimethyl orthovalerate, or tetraethyl orthocarbonate.

A ketone or diketone solubilising agent may be acetone, methyl ethyl ketone, acetylacetone (2,4-pentanedione), 2-methyl-3-hexanone, 2-ethylhexanal, 2-heptanone, 3-octanone, 5-nonanone, 2-tridecananone, 2,3-hexadione, or 5-diethylamino-2-pentanone.

A chlorinated hydrocarbon solubilising agent may be chloroform, or dichloromethane.

The organic solubilising agent may have a molecular weight of at most 600, and preferably of at most 400 or 300. Generally, it is desirable to reduce the molecular weight of the solubilising agent as this minimises any viscosifying effect the solubilising agent may have on the wellbore fluid.

The ratio of the volume of the organic solubilising agent to the volume of the non-aqueous continuous phase may be at least 0.1 and preferably is at least 0.25.

A further aspect of the invention provides an additive for increasing the electrical conductivity of a wellbore fluid with a non-aqueous continuous phase, the additive comprising:

an organic solubilising agent having a dielectric constant of at least 5 and including one or more organic salts having the formula $((R_1\text{-}Q)_pX)_mZ_n$, one or more organic acids corresponding to the organic salts, one or more oligomeric organic salts based on linked $((R_1\text{-}Q)_pX)_mZ_n$ subunits, one or more oligomeric organic acids corresponding to the oligomeric organic salts, or a mixture thereof dissolved therein;

wherein X is a negatively charged functional group, $R_1$ is an organic (preferably aliphatic) group comprising a principal straight chain and one or more side chains which branch from and are shorter than said principal straight chain, Q is a covalent bond or a polar linkage group which connects a terminal atom of the principal straight chain of the organic group $R_1$ to the functional group X, p is a positive integer (e.g. 1, 2, 3 etc.) which is the number of organic groups $R_1$ which are connected to the functional group X, Z is a cation (which may be inorganic or organic), and m and n are positive integers (e.g. 1, 2, 3 etc.) which ensure that the organic salts are charge neutral.

If present, the organic acids are intended to be wholly or partly neutralised in situ in the non-aqueous continuous phase of the wellbore fluid to form $(R_1\text{-}Q)_pX$ anions.

The additive is intended to form a wellbore fluid according to the first aspect of the invention when added to a non-aqueous wellbore fluid. Thus the additive may have preferred and optional features corresponding to preferred and optional features of the first aspect.

The concentration (i.e. total concentration) in the organic solubilising agent of the one or more organic salts, one or more organic acids, one or more oligomeric organic salts, one or more oligomeric organic acids, or the mixture thereof may be in the range 0.004 to 4 M at 20° C., and preferably 0.25 to 2 M.

A further aspect of the present invention provides a method of increasing the electrical conductivity of a non-aqueous wellbore fluid with a non-aqueous continuous phase, comprising adding to the wellbore fluid one or more organic salts having the formula $((R_1\text{-}Q)_pX)_mZ_n$, one or more organic acids corresponding to the organic salts and being intended to form $(R_1\text{-}Q)_pX$ anions in the non-aqueous continuous phase of the wellbore fluid, one or more oligomeric organic salts based on linked $((R_1\text{-}Q)_pX)_mZ_n$ subunits, one or more oligomeric organic acids corresponding to the oligomeric organic salts and being intended to form oligomerically linked $(R_1\text{-}Q)_pX$ anions in the non-aqueous continuous phase of the wellbore fluid, or a mixture thereof;

wherein X is a negatively charged functional group, $R_1$ is an organic (preferably aliphatic) group comprising a principal straight chain and one or more side chains which branch from and are shorter than said principal straight chain, Q is a covalent bond or a polar linkage group which connects a terminal atom of the principal straight chain of the organic group $R_1$ to the functional group X, p is a positive integer (e.g. 1, 2, 3 etc.) which is the number of organic groups $R_1$ which are connected to the functional group X, Z is a cation (which may be inorganic or organic), and m and n are positive integers which ensure that the organic salts are charge neutral.

Performance of the method is intended to result in a wellbore fluid according to the first aspect of the invention. Thus the method may have preferred and optional features corresponding to preferred and optional features of the first aspect.

For example, the method may further comprise adding to the wellbore fluid an electrical conductivity-enhancing amount of an organic solubilising agent having a dielectric constant of at least 5, and preferably of at least 10 or 20.

Further aspects of the invention provide (a) a method of logging a wellbore, comprising (i) providing the non-aqueous wellbore fluid of the first aspect of the invention in the wellbore, and (ii) transmitting electrical signals through the wellbore fluid to perform electrical well-logging in the wellbore, and (b) a method of drilling a wellbore, comprising (i) providing the non-aqueous wellbore fluid of the first aspect of the invention in the wellbore, and (ii) transmitting electrical signals through the wellbore fluid to control a directional drill assembly in the wellbore.

BRIEF DESCRIPTION OF THE DRAWINGS

Specific embodiments of the present invention will now be described with reference to the following drawings in which.

DETAILED DESCRIPTION

Unbranched straight chain acid salts (commonly termed n-alkylcarboxylates) are not soluble in oil although the corresponding acids are soluble. We have found, however, that if branching is added to the chain at strategic points, particularly α- to the carbonyl, the resulting acids and surprisingly their salts have high solubilities in hydrocarbons. We have observed similar behaviour in phosphates and sulphonates. Sulphates, phosphonates and xanthates with similarly branched chains are expected to behave in essentially the same way. Oligomers of the branched chain salts are also expected to behave in essentially the same way.

EXAMPLE 1

Figure 1:
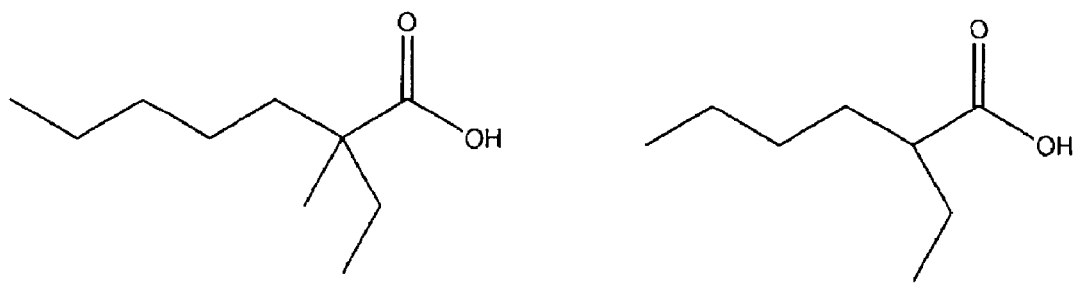
FIG. 1 shows the structures of versatic acid and 2-ethyl hexanoic acid.

Examples of acid salts which show this phenomenon are salts of versatic acid and 2-ethyl hexanoic acid (see FIG. 1) These are examples of salts in which Q is a covalent bond and p equals 1.

Figure 2:
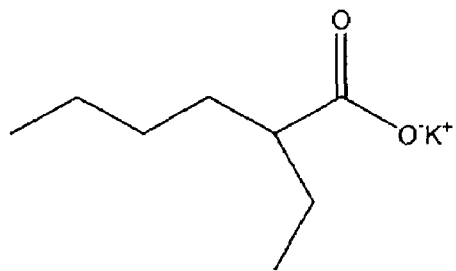
FIG. 2 shows the structure of potassium 2-ethyl hexanoate.

A variety of metal carboxylates were prepared in heptane by reacting versatic acid and 2-ethyl hexanoic acid directly with the metal of choice or with a metal base such as the hydride or hydroxide. Lithium, sodium, potassium, rubidium, calcium and gadolinium systems were synthesised. The example described in detail below is potassium 2-ethyl hexanoate (FIG. 2), the other systems behaving in analogous manners (although the measured conductivities varied somewhat). Metal concentrations of up to about 2 M can be achieved and conductivities of up to about 2 iS·cm$^{-1}$ at 20° C. were measured, such conductivities being above the level required for downhole electrical logging operations.

Figure 3:
FIG. 3 shows the structures of Brij 30 and neopentyl glycol.
Figure 3:
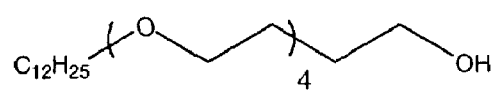
Figure 4:
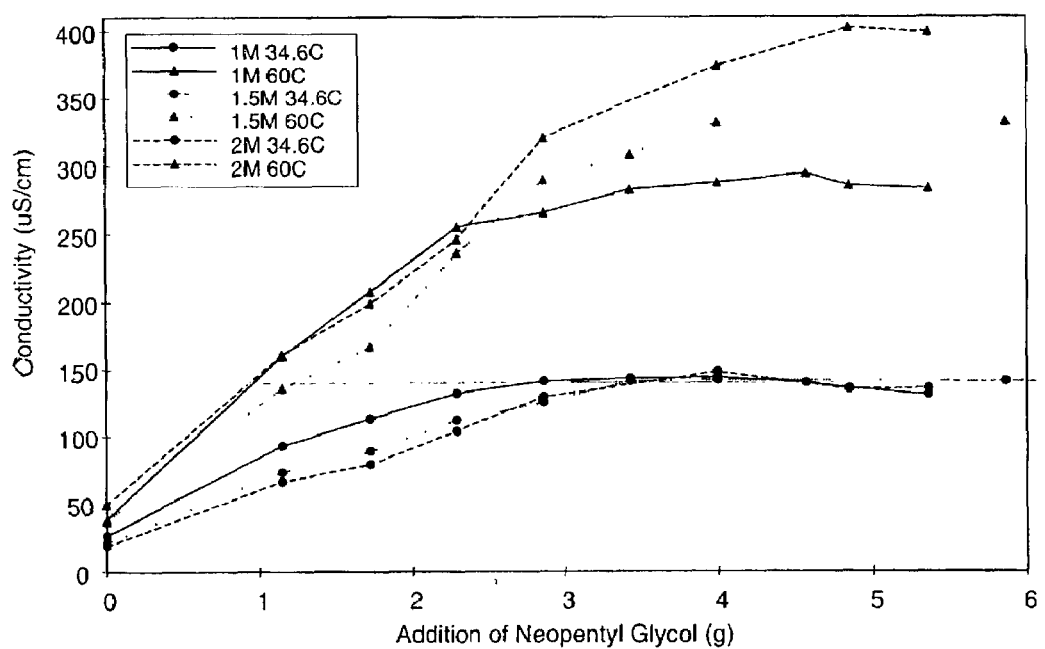
FIG. 4 shows the measured conductivities for 1, 1.5 and 2 M solutions of potassium 2-ethyl hexanoate in Brij 30 (10 ml) at both 36.4 and 60° C. with varying amounts of neopentyl glycol addition in each solution.

Upon replacement of the heptane with an ether solubilising agent such as 18-crown-6 or Brij 30 the measured conductivities increased significantly, to 50 iS·cm$^{-1}$ for 2 M potassium 2-ethyl hexanoate at 60° C. Further improvements were observed when neopentyl glycol solubilising agent was added with conductivities of the order 400 iS·cm$^{-1}$ being observed. FIG. 3 shows the structures of Brij 30 and neopentyl glycol and FIG. 4 shows the measured conductivities for 1, 1.5 and 2 M solutions of potassium 2-ethyl hexanoate in Brij 30 (10 ml) at both 36.4 and 60° C. with varying amounts of neopentyl glycol addition in each solution. At the levels studied, the neopentyl glycol additions had a strong positive effect on the conductivity despite also increasing the overall dilution of the potassium 2-ethyl hexanoate.

Next, an additive mixture was formed consisting of 1 M potassium 2-ethyl hexanoate and 2.2 M neopentyl glycol in Brij 30. Varying amounts of the additive were then combined with a mineral spirits base solvent (representative of a non-aqueous wellbore fluid) and the conductivities of the resulting liquids measured at temperatures of 34.6, 40, 50 and 60° C.

Figure 5:
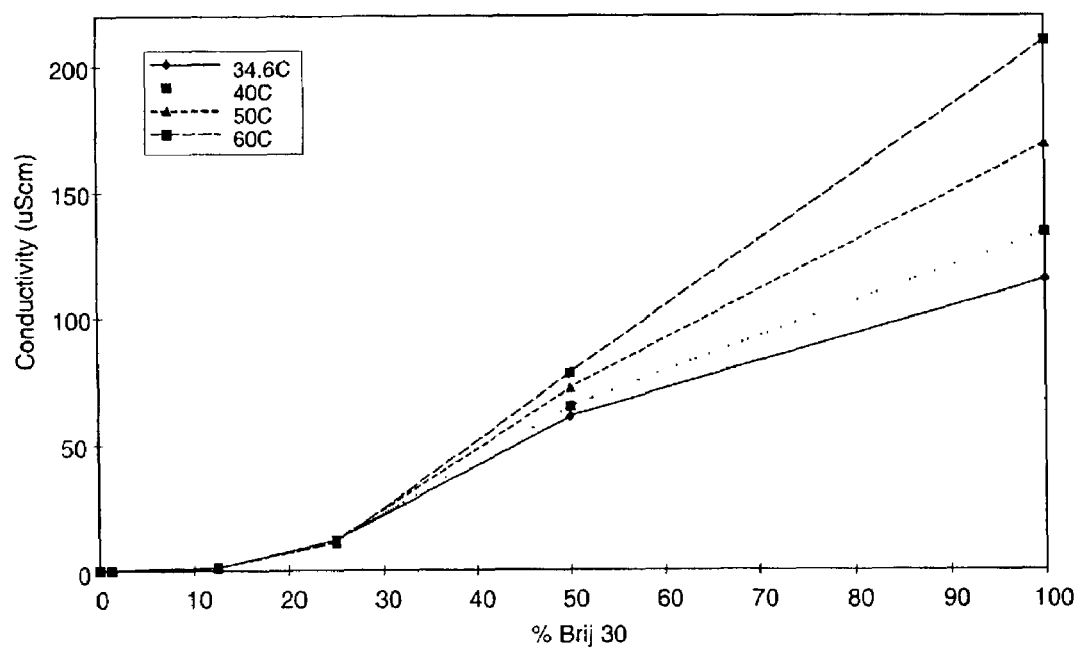
FIG. 5 shows the measured conductivities at 34.6, 40, 50 and 60° C. of liquids containing varying proportions (by volume) of an additive mixture and a mineral spirits base solubilising agent, the additive mixture consisting of 1 M potassium 2-ethyl hexanoate and 2.2 M neopentyl glycol in Brij 30.

FIG. 5 shows the measured conductivities of solutions in which the volume ratios of the additive mixture to the mineral spirits were respectively 0, 12.5, 25, 50 and 100%. A volume ratio of about 25% was sufficient to raise the conductivity to useful levels at the respective temperatures.

EXAMPLE 2

Figure 6:
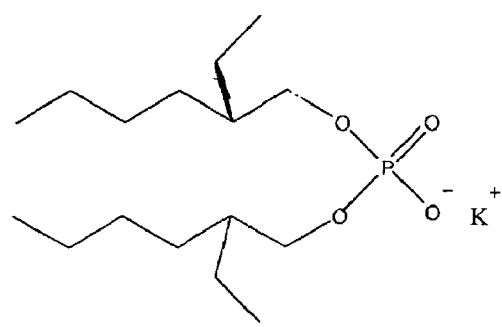
FIG. 6 shows the structure of potassium bis(2-ethylhexyl) phosphate.

FIG. 6 shows another organic salt (potassium bis(2-ethylhexyl) phosphate) which shows the phenomenon. This is an example of a salt in which Q is a covalent bond and p equals 2.

The potassium salt of bis(2-ethylhexyl) hydrogen phosphate was made by the direct reaction of potassium hydride with the corresponding acid in heptane. The acid bis(2-ethylhexyl) hydrogen phosphate (Aldrich Chemicals; 64.49 grams or 0.2 moles) was placed in 300 ml of dry heptane and stirred gently. An excess of potassium hydroxide granules was added to the solution and left to stir until no further potassium hydroxide reacted. At completion the reaction solution was decanted and the heptane evaporated to leave the potassium bis(2-ethylhexyl) phosphate salt as a white waxy solid.

A 1 molar solution of potassium bis(2-ethylhexyl) phosphate in Brij 30 was then prepared by dissolving 18.02 grams of the salt in 47.5 grams (50 ml) of the solubilising agent. The conductivity of the resulting solution was 45.5 iS/cm, compared to a conductivity of 0.25 iS/cm for Brij 30 in the absence of the salt.

Figure 7:
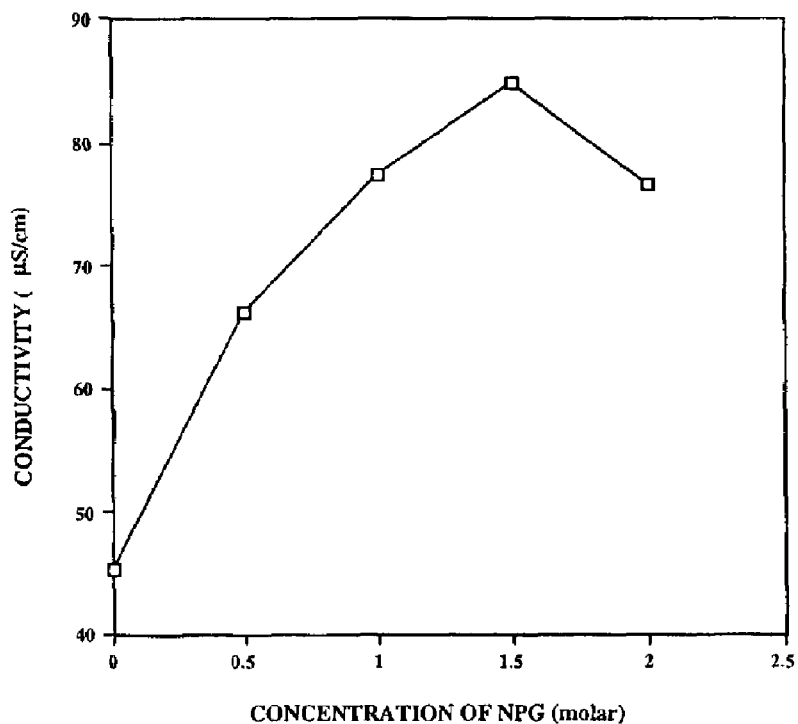
FIG. 7 shows the variation in conductivity of a 1 molar potassium bis(2-ethylhexyl) phosphate solution in Brij 30 on the addition of successive amounts of neopentyl glycol.

FIG. 7 shows the variation in the conductivity of the potassium bis(2-ethylhexyl) phosphate/Brij 30 solution on the addition of successive amounts of neopentyl glycol. The conductivity of the solution reached a limiting value for concentrations of neopentyl glycol in excess of 1.0 molar.

Figure 8:
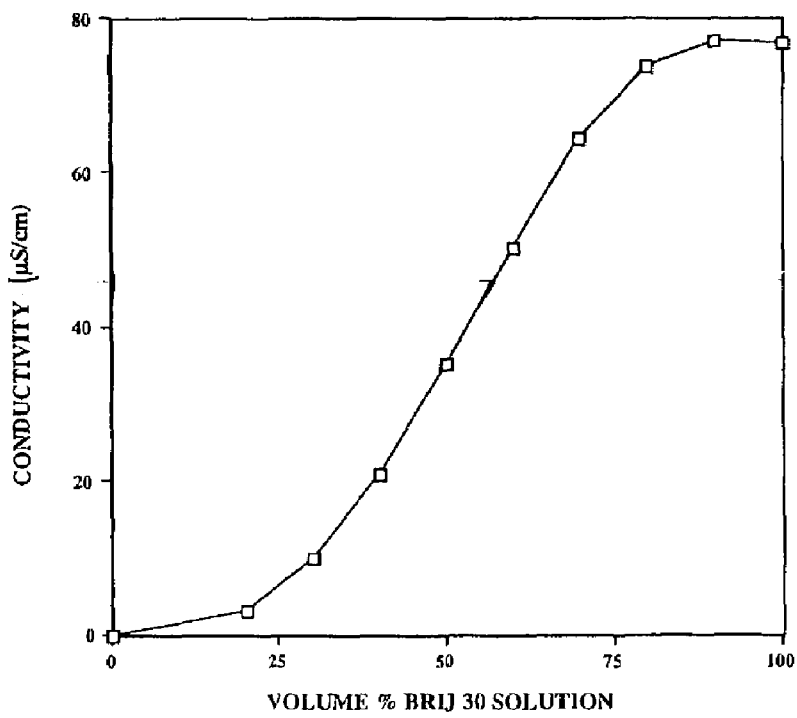
FIG. 8 shows the conductivity of a 1 molar potassium bis(2-ethylhexyl) phosphate and 2 molar neopentyl glycol solution in Brij 30 as a function of the volume fraction of the solution in mineral spirits.

FIG. 8 shows the conductivity of the final potassium bis(2-ethylhexyl) phosphate/Brij 30/neopentyl glycol solution of FIG. 7 (i.e. 1 molar potassium bis(2-ethylhexyl) phosphate and 2 molar neopentyl glycol in Brij 30) as a function of its volume fraction (expressed as a percentage) in mineral spirits. When the volume fraction of minerals spirits was 80% (20% Brij 30 solution) the conductivity was 3.2 iS/cm.

EXAMPLE 3

Figure 9:
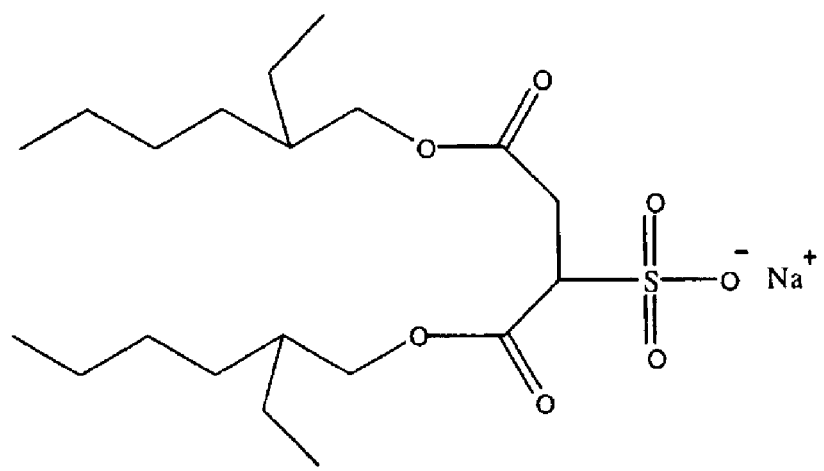
FIG. 9 shows the structure of bis(2-ethylhexyl) sulfosuccinate (AOT)

FIG. 9 shows yet another organic salt (the sodium salt of bis(2-ethylhexyl) sulfosuccinate—commonly known as AOT) which shows the phenomenon. This is an example of a salt in which Q is an ester group, $R_4$ is an ethyl group, and p equals 2.

A 1 molar solution of AOT (Aldrich Chemicals) in Brij 30 was prepared by dissolving 22.23 grams of AOT in 47.5 grams (50 ml) of Brij 30. The conductivity of the Brij 30 increased from 0.25 iS/cm to 15.7 iS/cm on the addition of the AOT.

Figure 10:
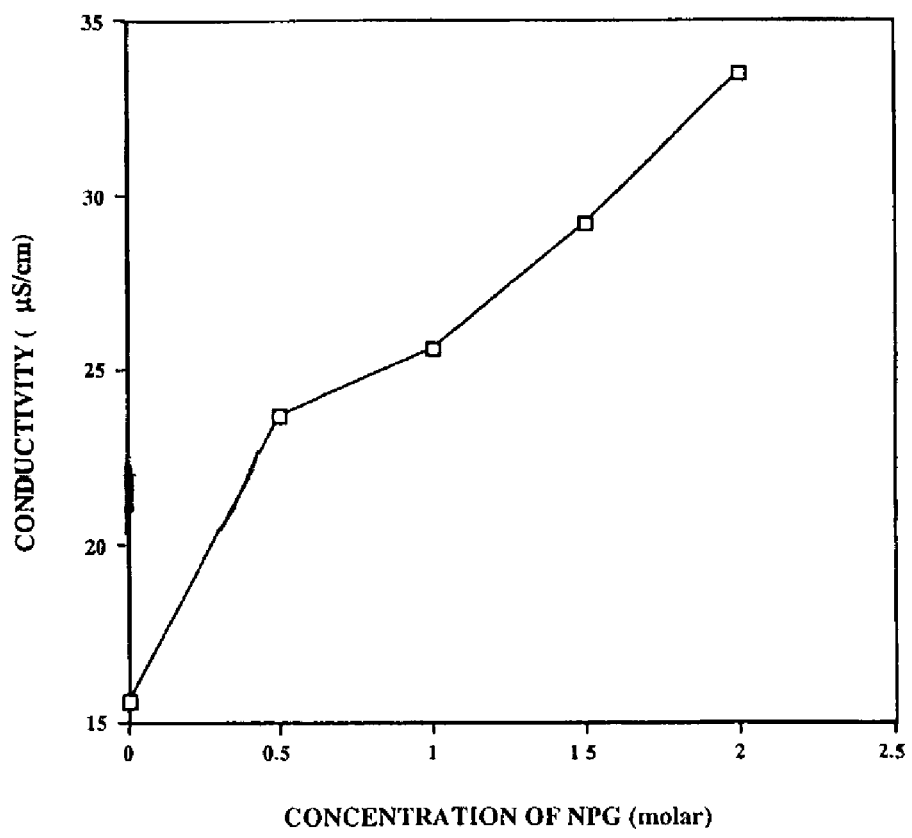
FIG. 10 shows the variation in conductivity of a 1 molar AOT solution in Brij 30 on the addition of successive amounts of neopentyl glycol.

FIG. 10 shows the variation in the conductivity of the AOT/Brij 30 solution at 25° C. on the addition of successive amounts of neopentyl glycol. The addition of 10.42 grams of neopentyl glycol to the AOT/Brij 30 solution (corresponding to a 2.0 molar concentration of neopentyl glycol in the AOT/Brij 30 solution) increased the conductivity to 33.5 iS/cm.

Figure 11:
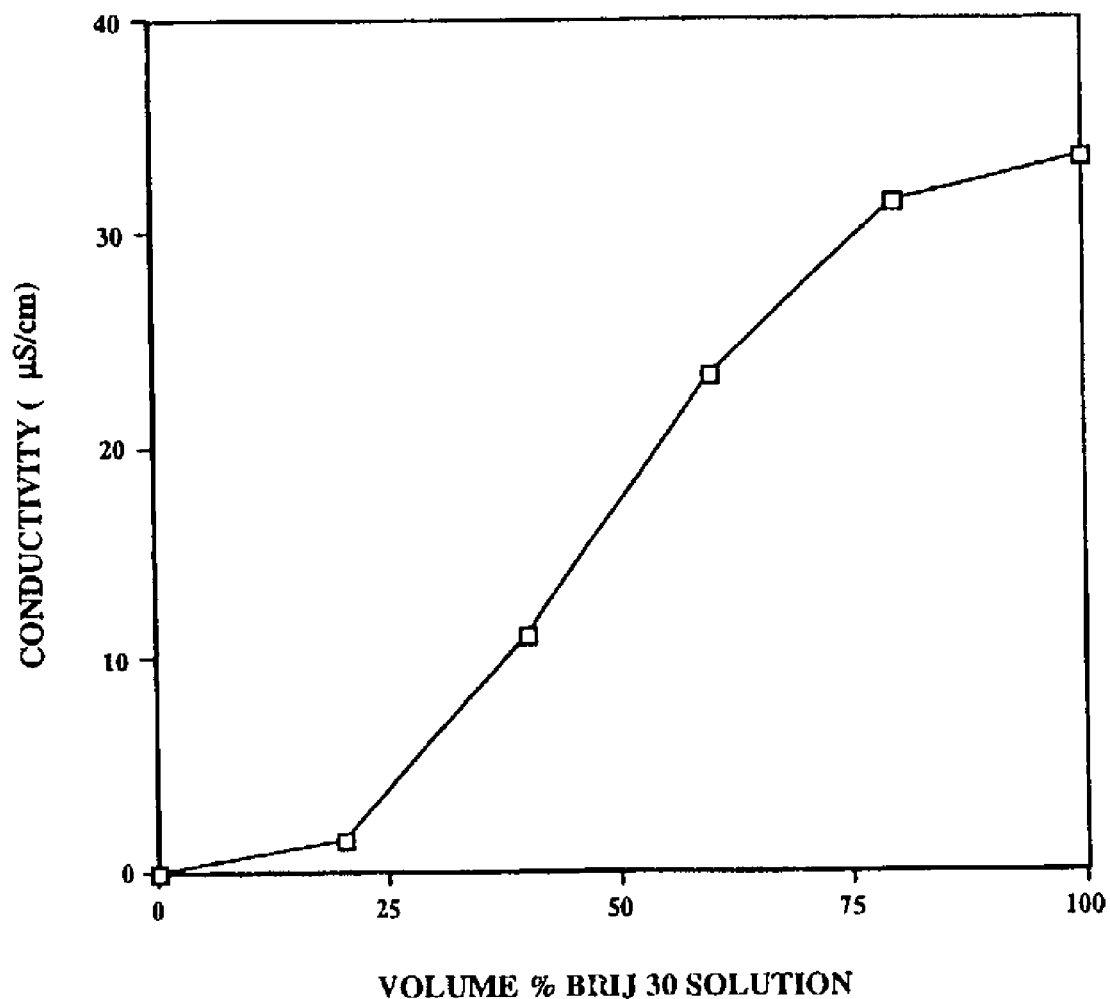
FIG. 11 shows the conductivity of a 1 molar AOT and 2 molar neopentyl glycol solution in Brij 30 as a function of the volume fraction of the solution in mineral spirits.

The final AOT/neopentyl glycol/Brij 30 solution of FIG. 10 (i.e. 1 molar AOT and 2 molar neopentyl glycol in Brij 30) was then diluted with successive amounts of mineral spirits and the conductivity measured at each addition. FIG. 11 shows the dependence of conductivity on the volume fraction of the AOT/neopentyl glycol/Brij 30 solution in mineral spirits. The conductivity of the AOT/neopentyl glycol/Brij 30 in mineral spirits when 80% of the volume was mineral spirits was 1.5 iS/cm.

In operational use, it will generally be desirable to minimise the amounts of organic salt and optionally polar solubilising agent that are used in order to reduce raw material costs. However, the results show that a wide range of conductivities can be obtained simply by adjusting these amounts. Therefore, depending on the requirements of the particular operational task (be it e.g. electrical logging or directional drilling) an appropriate wellbore fluid conductivity can be obtained.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A method of increasing the electrical conductivity of a non-aqueous wellbore fluid with a non-aqueous continuous phase, comprising adding to the wellbore fluid:
    a compound selected from the group consisting of:
    (i) one or more organic salts having the formula $((R_1\text{-}Q)_p X)_m Z_n$,
    (ii) one or more organic acids corresponding to said organic salts and being intended to form $(R_1\text{-}Q)_p X$ anions in the non-aqueous continuous phase of the wellbore fluid,
    (iii) one or more oligomeric organic salts based on linked $((R_1\text{-}Q)_p X)_m Z_n$ subunits,
    (iv) one or more oligomeric organic acids corresponding to the oligomeric organic salts and being intended to form oligomerically linked $(R_1\text{-}Q)_p X$ anions in the non-aqueous continuous phase of the wellbore fluid, or
    (v) a mixture thereof; and
    an electrical conductivity-enhancing amount of an organic solubilizing agent selected from the group consisting of: ethylene glycol; neopentyl glycol; a $C_8$-$C_{16}$ alcohol; a $C_3$-$C_{18}$ di-ol; a $C_8$-$C_{16}$ ketone; a $C_8$-$C_{16}$ ether; a $C_8$-$C_{16}$ ester; 1,3,5-trioxane, 1,4-dioxane, 1,4-dioxane-2,3-diol; a non-ionic surfactant comprising the reaction product of an aliphatic alcohol, acid, amide or alkyl phenol with an alkylene oxide; a crown ether; a polyoxyethylene sorbitan long-chain fatty acid ester; a sorbitan long chain fatty acid ester; tripropyl orthoformate, triethyl orthoformate, trimethyl orthobutyrate, malonaldehyde bis(diethyl acetal), 1,2,6,6-tetramethoxyhexane, trimethyl orthovalerate, tetraethyl orthocarbonate; chloroform, dichloromethane; and mixtures thereof, wherein the solubilizing agent has a dielectric constant of at least 5 wherein:
    X is a negatively charged functional group,
    $R_1$ is an organic group comprising a principal straight chain and one or more side chains which branch from and are shorter than said principal straight chain,
    Q is a covalent bond or a polar linkage group which connects a terminal atom of the principal straight chain of the organic group $R_1$ to the functional group X,
    p is a positive integer which is the number of organic groups $R_1$ which are connected to the functional group X,
    Z is a cation selected from the group consisting of $Li^+$, $K^+$, $Na^+$, $Mg^{2+}$, $Ca^{2+}$, $Sr^{2+}$, and $Ba^{2+}$; and
    m and n are positive integers which ensure that the organic salts are charge neutral; and
    wherein the concentration of the one or more organic salts in the non-aqueous continuous phase is in the range of 0.001 to 3 M at 20° C.

2. A method of increasing the electrical conductivity of a non-aqueous wellbore fluid according to claim 1, wherein X is a carboxylate, ($-COO^-$) functional group.

3. A method of increasing the electrical conductivity of a non-aqueous wellbore fluid according to claim 1, wherein Q is a covalent bond.

4. A method of increasing the electrical conductivity of a non-aqueous wellbore fluid according to claim 1, wherein Q is a polar linkage group.

5. A method of increasing the electrical conductivity of a non-aqueous wellbore fluid according to claim 1, wherein the or each side chain branches from said terminal atom of the principal straight chain.

6. A method of increasing the electrical conductivity of a non-aqueous wellbore fluid according to claim 1, wherein said principal straight chain contains from 3 to 25 carbon atoms.

7. A method of increasing the electrical conductivity of a non-aqueous wellbore fluid according to claim 1, wherein the or each side chain contains from 1 to 6 carbon atoms.

8. A method of increasing the electrical conductivity of a non-aqueous wellbore fluid according to claim 1, wherein said principal straight chain is a hydrocarbyl group.

9. A method of increasing the electrical conductivity of a non-aqueous wellbore fluid according to claim 1, wherein the or each side chain is a hydrocarbyl group.

10. A method of increasing the electrical conductivity of a non-aqueous wellbore fluid according to claim 1, wherein the $R_1$ organic group comprises two side chains.

11. A method of increasing the electrical conductivity of a non-aqueous wellbore fluid according to claim 1, wherein the organic solubilising agent has a molecular weight of at most 600.

12. A method of increasing the electrical conductivity of a non-aqueous wellbore fluid according to claim 1, wherein the ratio of the volume of the organic solubilising agent to the volume of the non-aqueous continuous phase is at least 0.1.

13. A method of increasing the electrical conductivity of a non-aqueous wellbore fluid according to claim 1 which provides an electrical conductivity of at least 0.1 $iS \cdot cm^{-1}$ at 20° C. and at a frequency of 1 kHz.

14. The method of claim 1, wherein the organic solubilizing agent is a $C_8$-$C_{16}$ alcohol selected from the group consisting of: hexan-1-ol, hexan-2-ol, octan-1-ol, lauryl alcohol, oleyl alcohol, 2-ethylhexanol, or a mixture thereof.

15. The method of claim 1, wherein the organic solubilizing agent is a $C_3$-$C_{18}$ diol selected from the group consisting of: propylene-1,2-diol, propylene-1,3-diol, butan-1,4-diol, pentan-1,5-diol, pentan-1,2-diol, octan-1,8-diol, octan-1,2-diol, octadecan-1,2-diol, cyclohexan-1,2-diol, neopentyl glycol (2,2-dimethyl-1,3-propanediol), 2-ethyl-2-methyl-1,3-propanediol, 2,2-diethyl-1,3-propanediol, 2-methyl-2-propyl-1,3-propanediol, 2-butyl-2-ethyl-1,3-propanediol, or a mixture thereof.

16. The method of claim 1, wherein the organic solubilizing agent is a $C_8$-$C_{16}$ ketone is selected from the group consisting of: 2-ethylhexanal, 2-heptanone, 3-octanone, 5-nonanone, 2-tridecananone, 5-diethylamino-2-pentanone, or a mixture thereof.

17. The method of claim 1, wherein the organic solubilizing agent is a $C_8$-$C_{16}$ ether selected from the group consisting of: dibutyl ether, dioctylether, or a mixture thereof.

18. The method of claim 1, wherein the organic solubilizing agent is a $C_8$-$C_{16}$ ester selected from the group consisting of: methyl 2-ethylhexanoate, octyl acetate, hexyl butyrate, tributyl citrate, triethyl citrate, methyl oleate, bis(2-ethylhexyl) succinate, or a mixture thereof.

19. The method of claim 1, wherein the organic solubilizing agent is a non-ionic surfactant is selected from the group consisting of: polyoxyethylene(4) lauryl ether, polyoxyethylene(2) cetyl ether, polyoxyethylene(2) stearyl ether, polyoxyethylene(2) oleyl ether), polyoxyethylene(2) isooctylphenyl ether, polyoxyethylene(5) isooctylphenyl ether, polyoxyethylene(2) nonylphenyl ether, polyoxyethylene(5) nonylphenyl ether, or a mixture thereof.

20. The method of claim 1, wherein the organic solubilizing agent is a crown ether selected from the group consisting of: 12-crown-4 ether, 15-crown-5 ether, 18-crown-6 ether, dicyclohexano-24-crown-8 ether, dicyclohexano-18-crown-6 ether, or a mixture thereof.

21. The method of claim 1, wherein the organic solubilizing agent is a polyoxyethylene sorbitan long-chain fatty acid ester selected from the group consisting of: polyoxyethylene (20) sorbitan monolaurate, polyoxyethylene(20) sorbitan monopalmitate, polyoxyethylene(20) sorbitan monostearate, polyoxyethylene(20) sorbitan monooleate, polyoxyethylene (20) sorbitan trioleate, or a mixture thereof.

22. The method of claim 1, wherein the organic solubilizing agent is a sorbitan long-chain fatty acid ester selected from the group consisting of: sorbitan monolaurate, sorbitan monooleate, sorbitan monopalmitate, sorbitan monostearate, sorbitan sesquioleate, sorbitan trioleate, or a mixture thereof.

23. The method of claim 1, wherein the organic solubilizing agent is selected from the group consisting of: neopentyl glycol, polyoxyethylene (4) lauryl ether, or a mixture thereof.

\* \* \* \* \*